United States Patent
Song

(10) Patent No.: US 11,500,796 B2
(45) Date of Patent: Nov. 15, 2022

(54) DEVICE FOR INTERFACING BETWEEN MEMORY DEVICE AND MEMORY CONTROLLER, PACKAGE AND SYSTEM INCLUDING THE DEVICE

(71) Applicant: Samsung Electronics Co., Ltd., Suwon-si (KR)

(72) Inventor: Sangsub Song, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/172,420

(22) Filed: Feb. 10, 2021

(65) Prior Publication Data
US 2021/0397569 A1 Dec. 23, 2021

(30) Foreign Application Priority Data
Jun. 22, 2020 (KR) .......................... 10-2020-0075938

(51) Int. Cl.
*G06F 13/16* (2006.01)
*G06F 13/40* (2006.01)
*G06F 13/38* (2006.01)

(52) U.S. Cl.
CPC ........ *G06F 13/1673* (2013.01); *G06F 13/385* (2013.01); *G06F 13/409* (2013.01); *G06F 13/4068* (2013.01)

(58) Field of Classification Search
CPC .................................................. G06F 13/1673
See application file for complete search history.

(56) References Cited

U.S. PATENT DOCUMENTS

| | | |
|---|---|---|
| 6,985,778 B2 | 1/2006 | Kim et al. |
| 7,016,229 B2 | 3/2006 | Kim |
| 8,120,990 B2 | 2/2012 | Kim |
| 8,797,799 B2 | 8/2014 | Kim |
| 9,053,015 B2 | 6/2015 | Vasilyuk |
| 10,002,853 B2 | 6/2018 | Oh |
| 10,691,338 B2 | 6/2020 | Song et al. |

(Continued)

FOREIGN PATENT DOCUMENTS

| | | |
|---|---|---|
| KR | 10-2016-0150552 A | 12/2016 |
| KR | 10-2018-0004413 A | 1/2018 |

OTHER PUBLICATIONS

Hyun-Jin Kim et al., "1GB/s 2Tb NAND flash multi-chip package with frequency-boosting interface chip," Digest of Technical Papers—IEEE International Solid-State Circuits conference, Feb. 22-26, 2015.

(Continued)

*Primary Examiner* — David E Martinez
(74) *Attorney, Agent, or Firm* — Harness, Dickey & Pierce, P.L.C.

(57) ABSTRACT

An interface device between a plurality of memory devices and a memory controller includes processing circuitry configured to provide a plurality of controller channels for communicating with the memory controller, to provide a plurality of memory channels for communicating with the plurality of memory devices, and to connect each of the plurality of controller channels to at least one of the plurality of memory channels in a first mode and disconnect the plurality of controller channels from the plurality of memory channels in a second mode.

19 Claims, 18 Drawing Sheets

(56) References Cited

U.S. PATENT DOCUMENTS

| | | | |
|---|---|---|---|
| 2010/0125681 A1* | 5/2010 | Patel | G06F 1/3275 |
| | | | 710/14 |
| 2013/0119542 A1 | 5/2013 | Oh | |
| 2014/0237152 A1* | 8/2014 | Amirkhany | G06F 13/4022 |
| | | | 710/316 |
| 2015/0160890 A1 | 6/2015 | Semo et al. | |
| 2016/0189789 A1 | 6/2016 | Jigour et al. | |
| 2020/0183622 A1* | 6/2020 | Hubbard | G06F 3/0659 |

OTHER PUBLICATIONS

Hyun-Jin Kim et al., "A 1.2V 1.33GB/s/pin 8Tb NAND Flash Memory Multi-Chip Package Employing F-Chip for Low Power and High Performance Storage Applications" Symposium on VLSI Circuits Digest of Technical Papers (2017).

* cited by examiner

DEVICE FOR INTERFACING BETWEEN MEMORY DEVICE AND MEMORY CONTROLLER, PACKAGE AND SYSTEM INCLUDING THE DEVICE

CROSS-REFERENCE TO RELATED APPLICATION

This application is based on and claims priority under 35 U.S.C. § 119 to Korean Patent Application No. 10-2020-0075938, filed on Jun. 22, 2020, in the Korean Intellectual Property Office, the disclosure of which is incorporated by reference herein in its entirety.

BACKGROUND

The inventive concepts relate to memory devices, and more particularly, to a device for interfacing between a memory device and a memory controller, and a package and a system including the device.

With the development of semiconductor processes, data storage devices, including semiconductor memory devices, are used in various applications. For example, high capacity storage including a plurality of semiconductor memory devices may be used in a server, while a low capacity storage including a relatively small number of semiconductor memory devices may be used in a personal computer. Although various storages may include the same semiconductor memory devices, the various storages may include different components depending on the capacity, speed, and the like of each of the storages. Such different components may limit the use of a multi-chip package (MCP) in a storage that includes a plurality of semiconductor memory devices and provides high reliability and capacity (e.g., in a memory system).

SUMMARY

The inventive concepts provide an interface device for a multi-chip package that may be adaptively used according to requirements of a storage, and a storage including the interface device.

According to an aspect of the inventive concepts, there is provided an interface device between a plurality of memory devices and a memory controller, the interface device including: processing circuitry configured to provide a plurality of controller channels for communicating with the memory controller; to provide a plurality of memory channels for communicating with the plurality of memory devices; and a to connect each of the plurality of controller channels to at least one of the plurality of memory channels in a first mode; and disconnect at least one of the plurality of controller channels from the plurality of memory channels in a second mode.

According to an aspect of the inventive concepts, there is provided a memory package including: a plurality of memory devices, and at least one interface device between the plurality of memory devices and a memory controller, the at least one interface device configured to provide a plurality of controller channels for communicating with the memory controller and a plurality of memory channels for communicating with the plurality of memory devices, wherein the at least one interface device is configured to, in a first mode, connect each of the plurality of controller channels to at least one of the plurality of memory channels, and in a second mode, disconnects at least one of the plurality of controller channels from the plurality of memory channels.

According to an aspect of the inventive concepts, there is provided a memory system including: a memory controller configured to provide a host channel for communicating with a host; and a first memory package comprising a plurality of memory devices and an interface device, the interface device configured to set a number of controller channel based on a first signal received from outside of the first memory package, the controller channels for communicating with the memory controller, wherein the memory controller and the plurality of memory devices are configured to communicate with each other through at least one controller channel enabled by the interface device.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Although the terms "first," "second," "third," etc., may be used herein to describe various elements, components, and/or sections, these elements, components, and/or sections, should not be limited by these terms. These terms are only used to distinguish one element, component, or section, from another element, component, or section. Thus, a first element, component, or section, discussed below may be termed as a second element, component, or section, without departing from the scope of this disclosure.

Figure 1:
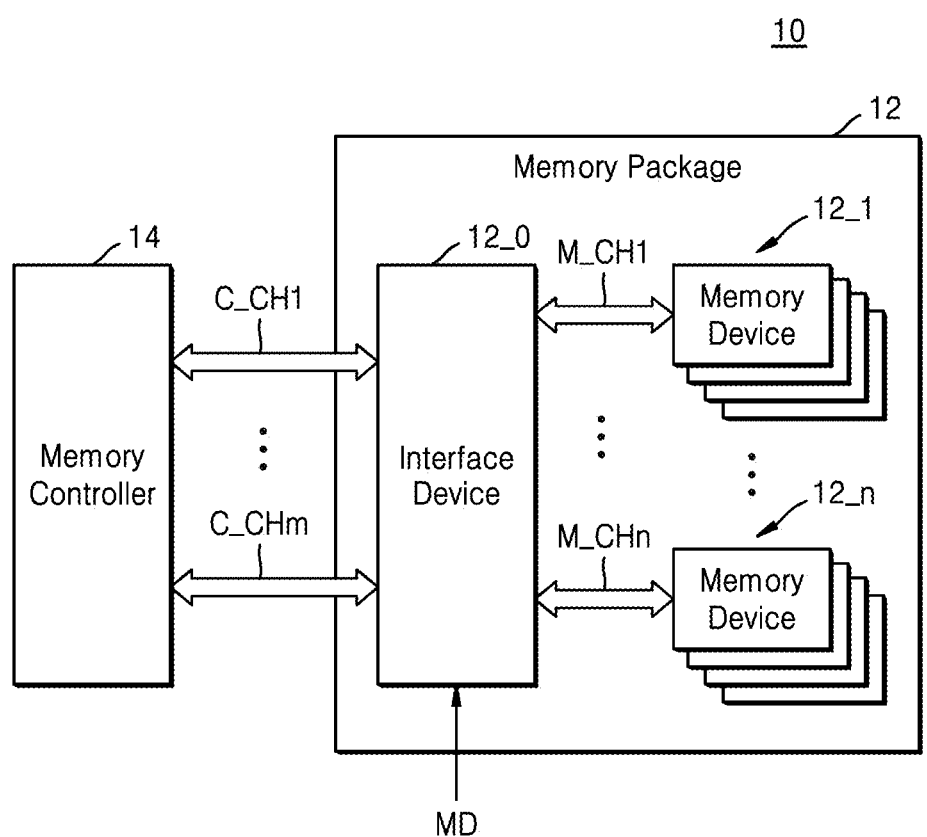
FIG. 1 is a block diagram illustrating a memory system according to an example embodiment of the inventive concepts.

FIG. 1 is a block diagram illustrating a memory system 10 according to an example embodiment of the inventive concepts. The memory system 10 may refer to storage including a semiconductor memory device. For example, the memory system 10 may include a solid-state drive (SSD), a universal flash storage (UFS), an embedded UFS, a multimedia card (MMC), an embedded MMC, and the like. The memory system 10 may communicate with a host (e.g., 5a in FIG. 2A or 5b in FIG. 2B) and store data in response to a request provided by the host. As illustrated in FIG. 1, the memory system 10 may include a memory package 12 and a memory controller 14, but is not so limited. For example, in some embodiments, as described below with reference to FIGS. 2A and 2B, the memory system 10 may include a plurality of memory packages.

The memory controller 14 may be configured to receive the request from the host and to respond to the request by controlling the memory package 12. For example, the memory controller 14 may be configured to receive a write request from the host and store data provided along with the write request in the memory package 12. In addition, the memory controller 14 may be configured to receive a read request from the host and to provide data stored in the memory package 12 to the host in response to the read request.

The memory package 12 may be configured to communicate with the memory controller 14 through at least one channel. For example, as shown in FIG. 1, the memory package 12 may be configured to communicate with the memory controller 14 through first to mth controller channels C_CH1 to C_CHm (wherein m is an integer greater than 0). As will be described later with reference to the drawings, the memory package 12 may be configured to set the number of enabled controller channels based on a mode signal MD (also referred to as a first signal herein) provided from outside the memory package 12, and also may communicate with the memory controller 14 through the enabled controller channel, but, for example, a disabled controller channel may not be used. Herein, the maximum number of controller channels supported by the memory package 12 may be referred to as available controller channels. As shown in FIG. 1, the memory package 12 may include an interface device 12_0 and first to nth memory devices 12_1 to 12_n (wherein n is an integer greater than 1).

The interface device 12_0 may be configured to provide an interface between the memory controller 14 and a plurality of memory devices, that is, the first to nth memory devices 12_1 to 12_n. For example, as shown in FIG. 1, the interface device 12_0 may be configured to provide the first to mth controller channels C_CH1 to C_CHm for communication with the memory controller 14, and to provide the first to nth memory channels M_CH1 to M_CHn for communicating with the first to nth memory devices 12_1 to 12_n. In some embodiments, each of the first to mth controller channels C_CH1 to C_CHm may have the same protocol as each of the first to nth memory channels M_CH1 to M_CHn. For example, each of the first to mth controller channels C_CH1 to C_CHm and the first to nth memory channels M_CH1 to M_CHn may include data lines, a clock line, command, lines and/or address lines. In addition, at least one line, for example the data lines, may be bidirectional signal lines.

The interface device 12_0 may be configured to receive the mode signal MD from outside of the memory package 12, to enable a controller channel to be used for communicating with the memory controller 14 among the first to mth controller channels C_CH1 to C_CHm based on the mode signal MD, and to disable the remaining controller channels. For example, the interface device 12_0 may be configured to connect the enabled controller channel to at least one of the first to nth memory channels M_CH1 to M_CHn, while the disabled controller channel is disconnected from the first to nth memory channels M_CH1 to M_CHn. Herein, connecting both channels may refer to forming a signal path (e.g., a connection) through which a signal transmitted from one channel may be transmitted to another channel, and disconnecting channels may refer to blocking transmission in a signal path through which a signal transmitted from one channel would be transmitted to another channel. Accordingly, as will be described later with reference to FIGS. 2A and 2B, the availability of the memory package 12 may be increased. Example embodiments of the interface device 12_0 will be described later with reference to FIGS. 3, 4, 5, and the like.

The first to nth memory devices 12_1 to 12_n may be configured to receive commands, addresses, and/or data from the interface device 12_0 through the first to nth memory channels M_CH1 to M_CHn and to provide data to the interface device 12_0. Each of the first to nth memory devices 12_1 to 12_n may include a single and/or a plurality of memory chips (and/or memory dies). The first to nth memory devices 12_1 to 12_n may include a semiconductor memory device manufactured by a semiconductor process. For example, the first to nth memory devices 12_1 to 12_n may include a non-transitory computer readable storage device such as a volatile memory device (e.g., static random access memory (SRAM) and/or dynamic random access memory (DRAM)), a non-volatile memory device (e.g., a flash memory, electrically erasable programmable read only memory (EEPROM), resistive random access memory (RRAM), magnetoresistive random access memory (MRAM), cross point memory, and/or phase change random access memory (PCRAM)), and/or a combination thereof.

The memory controller 14, the interface device 12_0, and/or their constituent components, as described below, may include and/or be included in processing circuitry such as hardware including logic circuits; a hardware/software combination such as a processor executing software; or a combination thereof. For example, the processing circuity more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

Figure 2A:
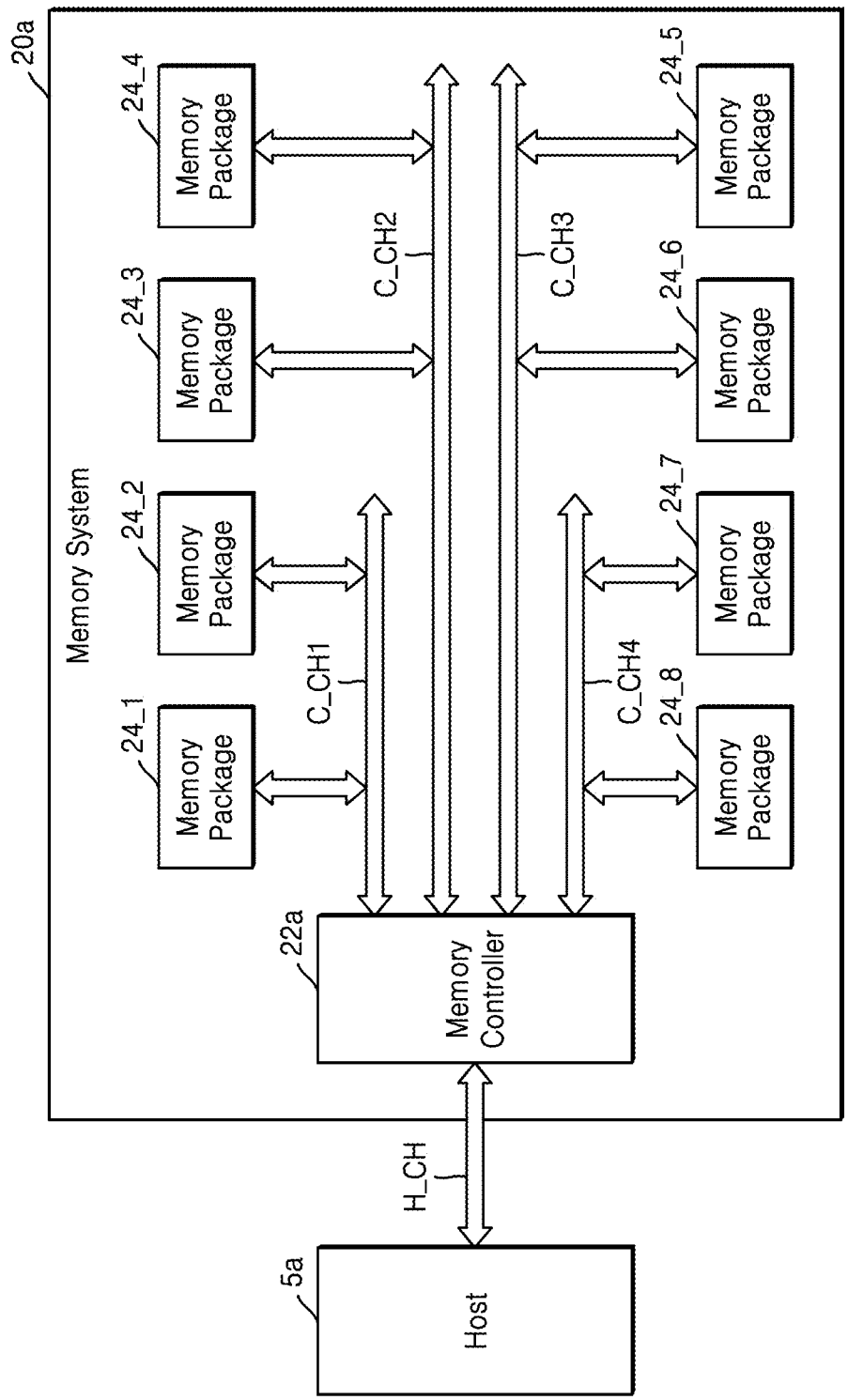
FIGS. 2A and 2B are block diagrams illustrating examples of a memory system according to some example embodiments of the inventive concepts.
Figure 2B:
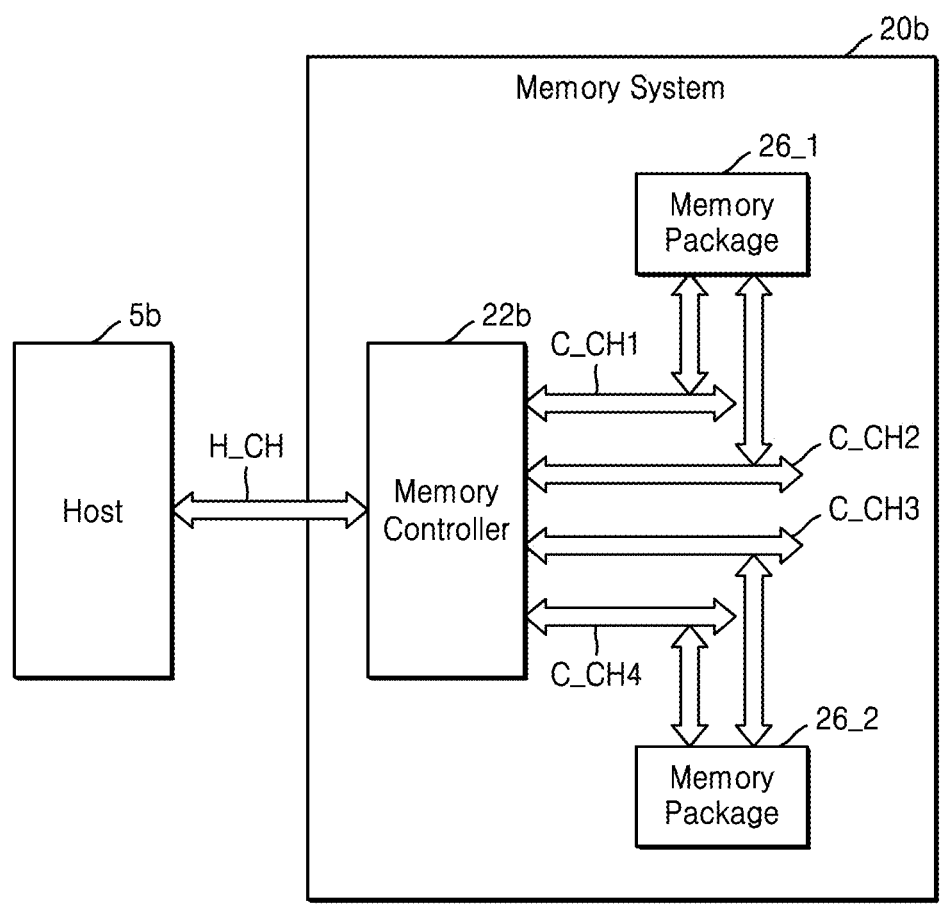

FIGS. 2A and 2B are block diagrams illustrating examples of a memory system according to some example embodiments of the inventive concepts. The block diagrams of FIGS. 2A and 2B show memory systems 20a and 20b together with the hosts 5a and 5b, in which the memory systems 20a and 20b are configured differently and using the memory package 12 of FIG. 1. Hereinafter, FIGS. 2A and 2B will be described with reference to FIG. 1, and duplicated descriptions of FIGS. 2A and 2B will be omitted.

Referring to FIG. 2A, the memory system 20a may communicate with a host 5a through a host channel H_CH. The host 5a may refer to a device that may access the memory system 20a through the host channel H_CH. For example, the host 5a may include processor circuitry such as hardware like a central processing unit (CPU), a digital signal processor (DSP), a graphics processing unit (GPU), and/or a neural network processing unit (NPU) each including at least one logic circuit and/or core, and/or a hardware/software combination. For example, the host 5a may include a hardware accelerator that is designed through logic synthesis. In addition, the memory system 20a may be configured to be detachably coupled to the host 5a, and the host 5a may include a computing system to which the memory system 20a is connected. The host channel H_CH may be based on an arbitrary interface, and may be based on, as non-limiting examples, a serial advanced technology attachment (SATA) interface, a peripheral component interconnect express (PCIe) interface, a universal serial bus (USB) interface, a universal flash storage (UFS) interface, an eMMC interface, and/or the like.

The memory system 20a may provide a higher data storage capacity to the host 5a, compared to the memory system 20b of FIG. 2B. For example, the host 5a and the memory system 20a may be included in a server and/or a high-performance computing system. As shown in FIG. 2A, the memory system 20a may include a memory controller 22a and first to eighth memory packages 24_1 to 24_8. However, the example embodiment is not so limited and may include, for example, a plurality of memory packages greater than or less than eight. Each of the first to eighth memory packages 24_1 to 24_8 may correspond to the memory package 12 of FIG. 1 and may be configured to be set by the mode signal MD to communicate with the memory controller 22a using one of a plurality of controller channels. For example, as shown in FIG. 2A, the memory controller 22a may be configured to provide first to fourth controller channels C_CH1 to C_CH4, and the first and second memory packages 24_1 and 24_2 may communicate with the memory controller 22a through the first controller channel C_CH1, the third and fourth memory packages 24_3 and 24_4 may communicate with the memory controller 22a through the second controller channel C_CH2, the fifth and sixth memory packages 24_5 and 24_6 may communicate with the memory controller 22a through the third controller channel C_CH3, and the seventh and eighth memory packages 24_7 and 24_8 may communicate with the memory controller 22a through the fourth controller channel C_CH4.

The memory system 20a may include a plurality of memory packages, (e.g., the first to eighth memory packages 24_1 to 24_8) in order to provide the high data storage capacity, while the memory controller 22a may provide a limited number of controller channels. Accordingly, two or more memory packages may be connected to one controller channel. However, as the number of memory packages connected to the controller channel increases, characteristics of a signal transmitted through the controller channel, for example, signal integrity (SI) may be degraded due to an increase in parasitic elements. Accordingly, in order to minimize connection to the controller channel and simultaneously provide access of the memory controller 22a to more memory devices, each of the first to eighth memory packages 24_1 to 24_8 may include an interface device 12_0.

Referring to FIG. 2B, the memory system 20b may be configured to communicate with the host 5b through the host channel H_CH and to provide a relatively low storage capacity to the host 5b, compared to the memory system 20a of FIG. 2A. For example, the host 5b and the memory system 20b may be included in a stationary-type personal computing system such as a desktop computer, or may be included in a portable personal computing system such as a laptop computer, a mobile phone, a wearable device, and/or the like. In addition, the host 5b and the memory system 20b may be included in home appliances, vehicles, and/or the like, as components, and/or may be included in internet of things (IoT) devices.

The memory system 20b may include a memory controller 22b and first and second memory packages 26_1 and 26_2, as shown in FIG. 2B. However, the example embodiment is not so limited and may include, for example, a plurality of memory packages greater than two. Each of the first to second memory packages 26_1 and 26_2 may correspond to the memory package 12 of FIG. 1 and may be configured to be set by the mode signal MD to communicate with the memory controller 22b using two controller channels among the plurality of controller channels. For example, as shown in FIG. 2B, the memory controller 22b may be configured to provide first to fourth controller channels C_CH1 to C_CH4. The first memory package 26_1 may be configured to communicate with the memory controller 22b through the first and second controller channels C_CH1 and C_CH2 and the second memory package 26_2 may be configured to communicate with the memory controller 22b through the third and fourth controller channels C_CH3 and C_CH4.

Unlike the memory package 12 of FIG. 1, when a memory package providing a fixed controller channel is used in the memory system 20a of FIG. 2A and the memory system 20b of FIG. 2B, each of the first to eighth memory packages 24_1 to 24_8 of FIG. 2A may be different from each of the first and second memory packages 26_1 and 26_2 of FIG. 2B. For example, as described above with reference to FIG. 1, the interface device 12_0 of FIG. 1 may set the number of controller channels by the mode signal MD, and accordingly, the memory package including the interface device 12_0 may be used in both the memory system 20a of FIG. 2A and the memory system 20b of FIG. 2B. As a result, the memory package that may be commonly used for various storages may be available, and therefore, the cost of the storage including the memory package, for example a memory system, may be reduced due to the higher availability of the memory package. Hereinafter, some example embodiments of the inventive concepts will be described with reference to the memory package including an interface circuit providing two available controller channels (m=2), but it is noted that the example embodiments of the inventive concepts may also be applied to the memory package including the interface circuit providing more than two available controller channels (m>2).

Figure 3:
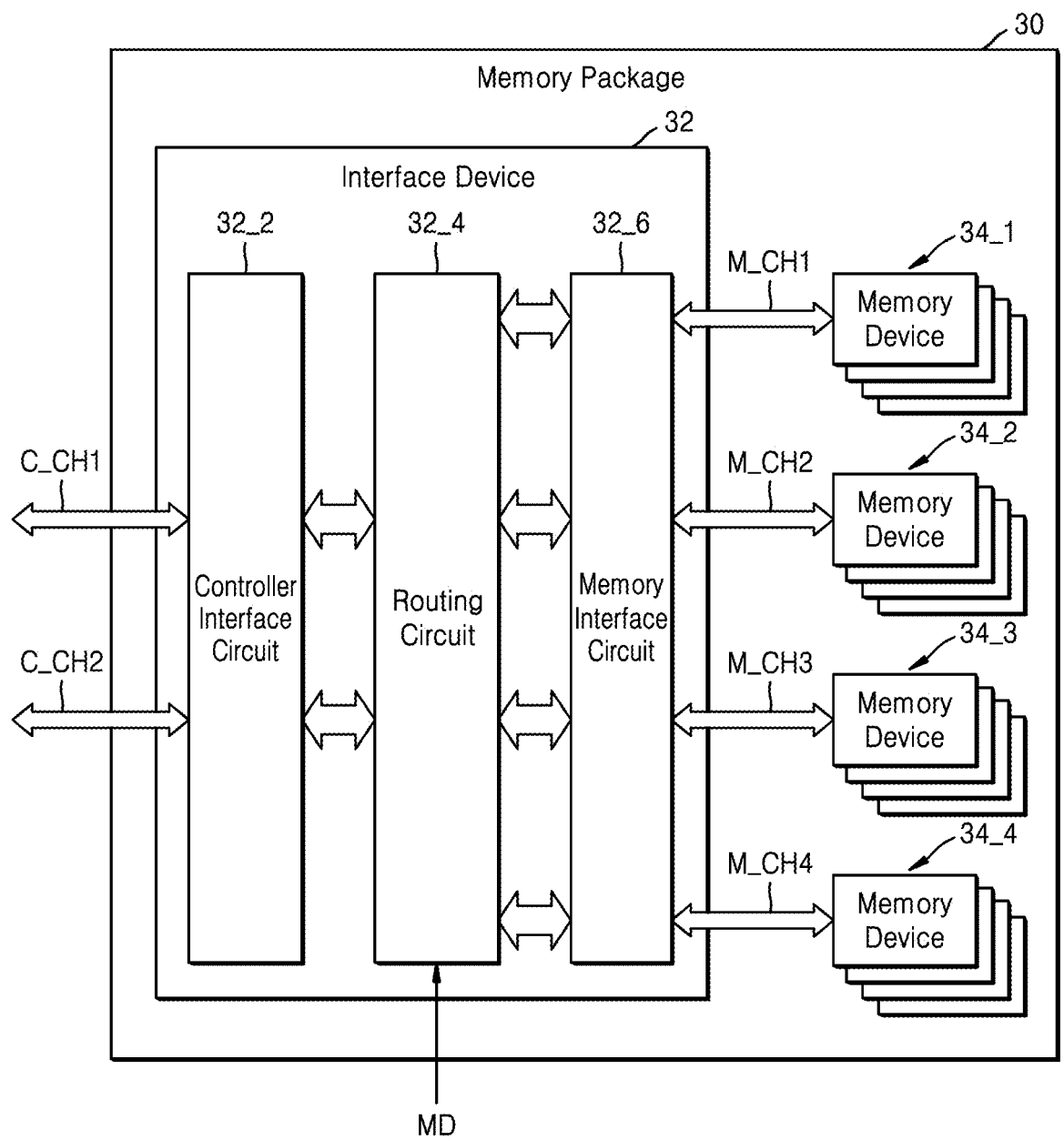
FIG. 3 is a block diagram illustrating a memory package according to an example embodiment of the inventive concepts.

FIG. 3 is a block diagram illustrating a memory package 30 according to an example embodiment of the inventive concepts. The block diagram of FIG. 3 illustrates the memory package 30 including an interface device 32 that provides two available controller channels (m=2) and four memory channels (n=4). As illustrated in FIG. 3, the memory package 30 may include the interface device 32 and first to fourth memory devices 34_1 to 34_4. Hereinafter, descriptions of FIG. 3 that overlap descriptions of FIG. 1 will be omitted.

The interface device 32 may include a controller interface circuit 32_2, a routing circuit 32_4, and a memory interface circuit 32_6. The controller interface circuit 32_2 may be configured to provide first and second controller channels C_CH1 and C_CH2 to the routing circuit 32_4 for communicating with a memory controller (e.g., the memory controller 14 in FIG. 1). The controller interface circuit 32_2 may be referred to as a first interface circuit herein. In some embodiments, the controller interface circuit 32_2 may include buffers (and/or buffer amplifiers) that are connected to signal lines included in the first and second controller channels C_CH1 and C_CH2, may be configured to provide output signals from the buffers, that have received signals through the first and second controller channels C_CH1 and C_CH2, to the routing circuit 32_4, and/or to also provide output signals from the buffers, that have received signals from the routing circuit 32_4, through the first and second controller channels C_CH1 and C_CH2. An example of the controller interface circuit 32_2 will be described later with reference to FIG. 4.

The memory interface circuit 32_6 may be configured to provide first to fourth memory channels M_CH1 to M_CH4, for communicating with first to fourth memory devices 34_1 to 34_4, to the routing circuit 32_4. The memory interface circuit 32_6 may also be referred to as a second interface circuit herein. In some embodiments, the memory interface circuit 32_6 may include buffers (and/or buffer amplifiers) that are connected to signal lines included in the first to fourth memory channels M_CH1 to M_CH4, to provide output signals from the buffers that have received signals through the first to fourth memory channels M_CH1 to M_CH4 to the routing circuit 32_4, and/or to provide output signals from the buffers, that have received signals from the routing circuit 32_4 through 4 memory channels M_CH1 to M_CH4, to the first to fourth memory devices 34_1 to 34_4. An example of the memory interface circuit 32_6 will be described later with reference to FIG. 4.

The routing circuit 32_4 may be configured to receive the mode signal MD from the outside of the memory package 30, and to connect the first and/or second controller channels C_CH1 and C_CH2 to at least one of the first to fourth memory channels M_CH1 to M_CH4 based on the mode signal MD, and/or disconnect the first and/or second controller channels C_CH1 and C_CH2 from the first to fourth memory channels M_CH1 to M_CH4.

Figure 4:
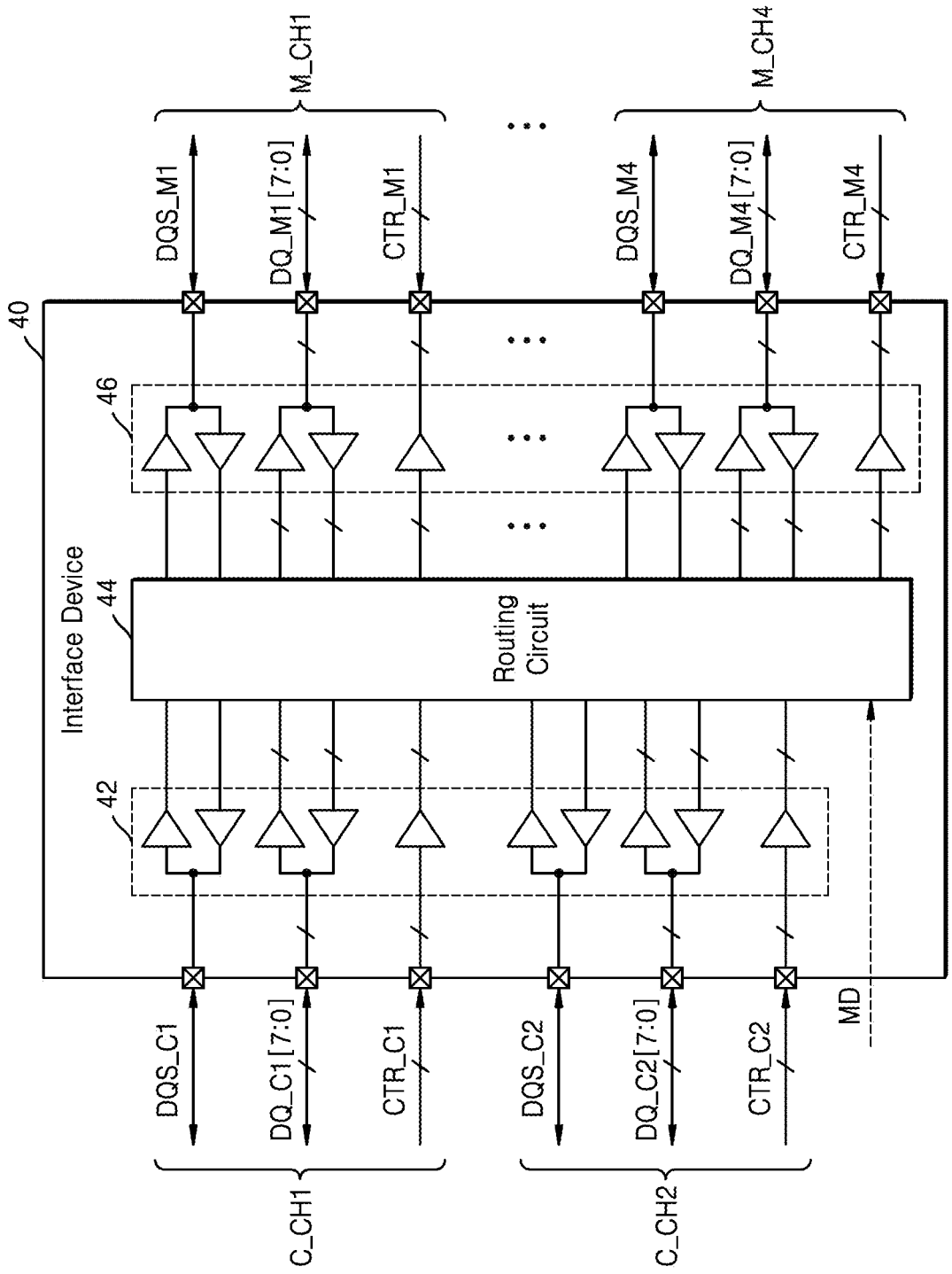
FIG. 4 is a block diagram illustrating an interface device according to an example embodiment of the inventive concepts.

FIG. 4 is a block diagram illustrating an interface device 40 according to an example embodiment of the inventive concepts. Specifically, the block diagram of FIG. 4 shows an example embodiment of the interface device 32 of FIG. 3. As described above with reference to FIG. 3, the interface device 40 of FIG. 4 may be connected between the first and second controller channels C_CH1 and C_CH2 and the first to fourth memory channels M_CH1 to M_CH4, and may include a controller interface circuit 42, a routing circuit 44, and a memory interface circuit 46. Hereinafter, descriptions of FIG. 4 that overlap descriptions of FIG. 3 will be omitted.

As noted in relation to FIG. 1, in some embodiments, each of the first and second controller channels C_CH1 and C_CH2 and the first to fourth memory channels M_CH1 to M_CH4 may be based on the same protocol. For example, the first controller channel C_CH1 may include a data strobe signal line DQS_C1, data lines DQ_C1[7:0], and control signal lines CTR_C1, and the second controller channel C_CH2 may include a data strobe signal line DQS_C2, data lines DQ_C2[7:0], and control signal lines CTR_C2. Similarly, the first memory channel M_CH1 may include a data strobe signal line DQS_M1, data lines DQ_M1[7:0], and control signal lines CTR_M1, and the fourth memory channel M_CH4 may include a data strobe signal line DQS_M4, data lines DQ_M4[7:0], and control signal lines CTR_M4.

The controller interface circuit 42 and the memory interface circuit 46 may include a plurality of buffers. For example, the controller interface circuit 42 may include a pair of buffers connected to a bidirectional signal line and a buffer connected to a unidirectional signal line. Similarly, the memory interface circuit 46 may also include a pair of buffers connected to a bidirectional signal line and a buffer connected to a unidirectional signal line. The buffer may have a high input impedance, and may be configured to generate an output signal by amplifying an input signal.

The routing circuit 44 may be configured to receive the mode signal MD from the outside of the interface device 40, as indicated by a dotted arrow in FIG. 4. The routing circuit 44 may obtain the mode signal MD from outside the interface device 40 and/or from outside the memory package, including the interface device 40, in various ways. Examples of obtaining the mode signal MD will be described later with reference to FIGS. 8A and 8B. The routing circuit 44 may be configured to be set to a first mode or a second mode based on the mode signal MD. Herein, the interface device 40 and the memory package including the routing circuit 44, when set to the first mode, may be referred to as being set to the first mode, and the interface device 40 and the memory package including the routing circuit 44, when set to the second mode, may be referred to as being set the second mode.

The routing circuit 44 may be configured to connect each of the first and second controller channels C_CH1 and C_CH2 to at least one of the first to fourth memory channels M_CH1 to M_CH4 in the first mode. For example, in the case wherein the first controller channel C_CH1 is connected to the first memory channel M_CH1, the routing circuit 44 may be configured to form signal paths such that output signals from the buffers of the controller interface circuit 42 (e.g., signals corresponding to the first controller channel C_CH1) are provided to the buffers of the memory interface circuit 46 corresponding to the first memory channel M_CH1 in order to connect the first controller channel C_CH1 to the first memory channel M_CH1. In addition, the routing circuit 44 may be configured to form signal paths such that output signals from the buffers of the memory interface circuit 46 (e.g., signals corresponding to the first controller channel C_CH1) are provided to the buffers of the controller interface circuit 42 corresponding to the first controller channel C_CH1.

The routing circuit 44 may be configured to disconnect one of the first and second controller channels C_CH1 and C_CH2 from the first to fourth memory channels M_CH1 to M_CH4 in the second mode. For example, in the case wherein the second controller channel C_CH2 is disconnected, the routing circuit 44 may disable (e.g., power down) buffers of the controller interface circuit 42 corresponding to the second controller channel C_CH2 in order to disconnect the second controller channel C_CH2 from the first to fourth memory channels M_CH1 to M_CH4.

The routing circuit 44 may include various devices to form signal paths and/or block signal transmission based on the mode signal MD. In some embodiments, the routing circuit 44 may include various devices to be controlled based on the mode signal MD, and may include, for example, a switch, a multiplexer, a demultiplexer, and/or the like. In some embodiments, the routing circuit 44 may include a logic circuit that generates control signals to enable and/or disable a plurality of buffers included in the controller interface circuit 42 and a plurality of buffers included in the memory interface circuit 46, based on the mode signal MD. Further, in some embodiments, the routing circuit 44 may include various elements to improve signal integrity, as described below with reference to FIG. 5.

Figure 5:
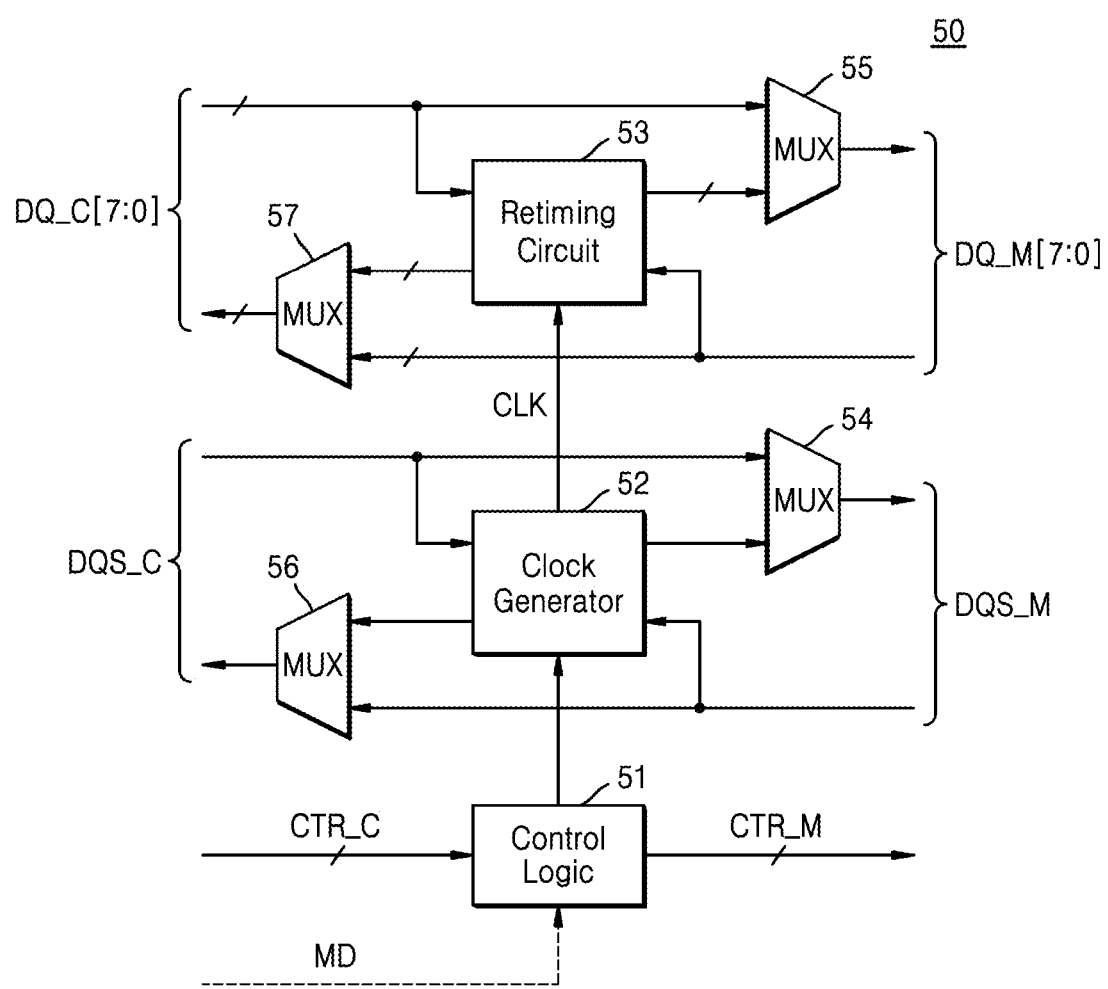
FIG. 5 is a block diagram illustrating a routing circuit according to an example embodiment of the inventive concepts.

FIG. 5 is a block diagram illustrating a routing circuit 50 according to an example embodiment of the inventive concepts. Specifically, the block diagram of FIG. 5 shows elements of the routing circuit 50 for improving signal integrity on a signal path formed according to the mode signal MD, which may be, for example, an example embodiment of the routing circuits 32_4 and/or 44 of FIGS. 3 and 4, respectively. In some embodiments, the elements of the routing circuit 50 shown in FIG. 5 may correspond to a single controller channel, and the routing circuit 50 may further include elements corresponding to each of available controller channels. As shown in FIG. 5, the routing circuit 50 may include a control logic 51, a clock generator 52, a retiming circuit 53, and first to fourth multiplexers 54 to 57.

The control logic 51 may be configured to generate a second control signal CTR_M from a first control signal CTR_C received from a memory controller and provide the second control signal CTR_M to a memory device. The control logic 51 may, for example, obtain the mode signal MD by receiving the mode signal MD as shown by a dotted line in FIG. 5, and/or by decoding the first control signal CTR_C. The control logic 51 may be configured to control the clock generator 52 based on the decoding result of the first control signal CTR_C and/or the mode signal MD. In some embodiments, each of the first and second control signals CTR_C and CTR_M may include a write enable signal, a read enable signal, an address latch enable signal, a command latch enable signal, and/or the like.

The clock generator 52 may be configured to generate a clock signal CLK from a first data strobe signal DQS_C received from the memory controller and/or a second data strobe signal DQS_M received from the memory device, and to provide the clock signal CLK to the retiming circuit 53. In addition, the clock generator 52 may be configured to provide a data strobe signal generated from the first data strobe signal DQS_C to the first multiplexer 54, and/or to provide a data strobe signal generated from the second data strobe signal DQS_M to the third multiplexer 56.

The retiming circuit 53 may be configured to generate a data signal by adjusting the timing of a first data signal DQ_C[7:0] received from the memory controller based on the clock signal CLK and/or to provide the data signal to the second multiplexer 55. In addition, the retiming circuit 53 may be configured to generate a data signal by adjusting the timing of a second data signal DQ_M[7:0] received from the memory device based on the clock signal CLK and/or to provide the data signal to the fourth multiplexer 57.

The control logic 51 may be configured to control the first to fourth multiplexers 54 to 57 based on the mode signal MD. For example, the control logic 51 may control the transmission of signals received from the memory controller to the memory device in a first mode (e.g., in which each of the available controller channels is connected to at least one memory channel). Accordingly, the first multiplexer 54 may output the first data strobe signal DQS_C as the second data strobe signal DQS_M, and the third multiplexer 56 may output the second data strobe signal DQS_M as the first data strobe signal DQS_C. Further, the second multiplexer 55 may output the first data signal DQ_C[7:0] as the second data signal DQ_M[7:0], and the fourth multiplexer 57 may output the second data signal DQ_M[7:0] as the first data signal DQ_C[7:0]. On the other hand, the control logic 51 may be configured to control the transmission of the signals generated by adjusting the timing of signals received from the memory controller to the memory device in a second mode (e.g., in which at least one of the available controller channels is disconnected from the memory channels). Accordingly, in the second mode, the first multiplexer 54 may output an output signal of the clock generator 52 as the second data strobe signal DQS_M, and the third multiplexer 56 may output the output signal of the clock generator 52 as the first data strobe signal DQS_C. In addition, the second multiplexer 55 may output an output signal of the retiming circuit 53 as the second data signal DQ_M[7:0], and the fourth multiplexer 57 may output the output signal of the retiming circuit 53 as the first data signal DQ_C[7:0]. Accordingly, degradation of signal integrity may be prevented in the second mode in which the number of memory channels connected to one controller channel is relatively large.

Figure 6A:
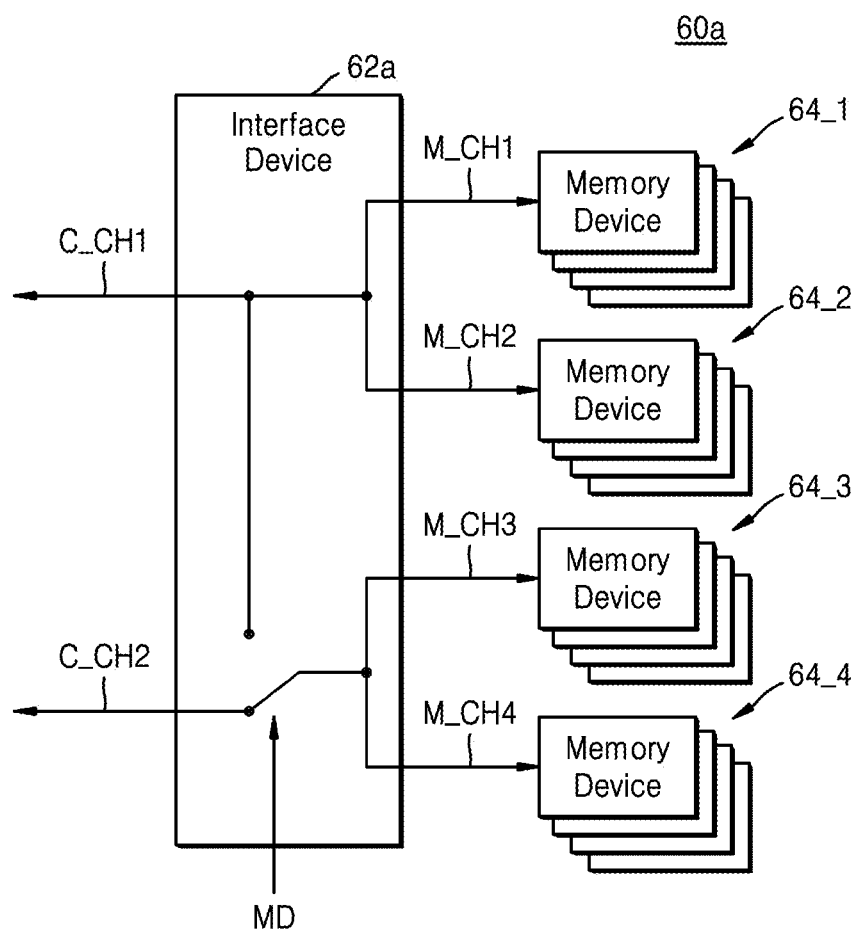
FIGS. 6A and 6B are block diagrams illustrating memory packages set to different modes according to example embodiments of the inventive concepts.
Figure 6B:
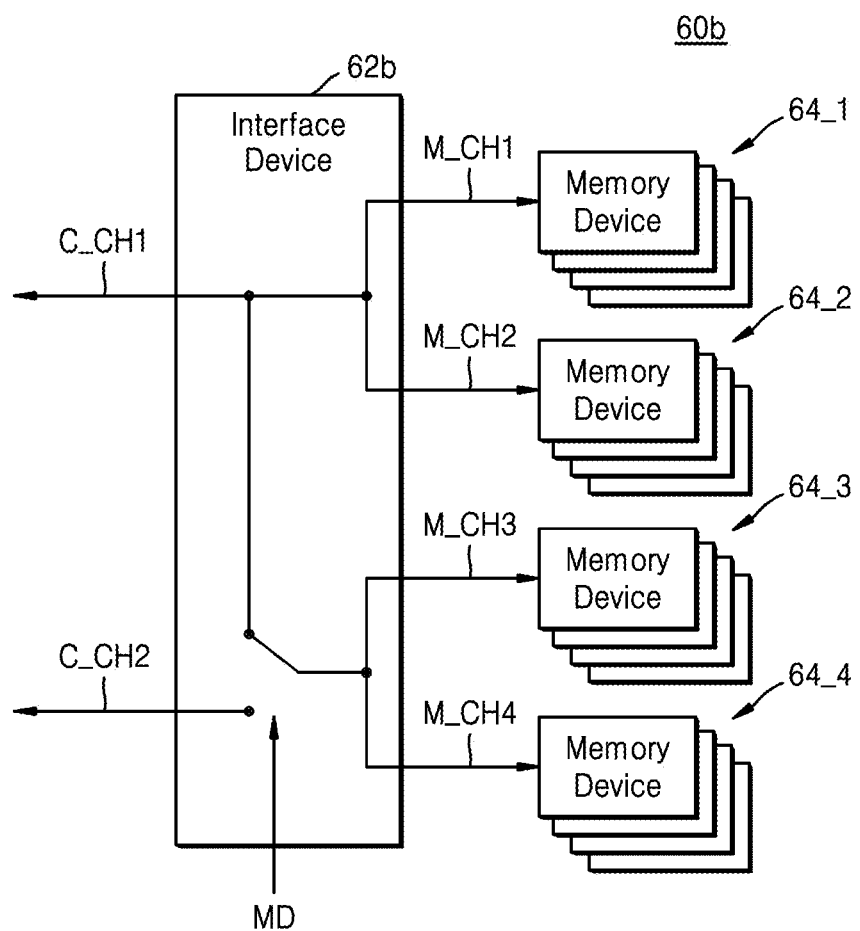

FIGS. 6A and 6B are block diagrams illustrating memory packages set to different modes according to some example embodiments of the inventive concepts. Specifically, the block diagram of FIG. 6A schematically shows a memory package 60a set to the first mode, and the block diagram of FIG. 6B schematically shows a memory package 60b set to the second mode.

Referring to FIG. 6A, the memory package 60a may include an interface device 62a and first to fourth memory devices 64_1 to 64_4. The interface device 62a may be configured to be set to the first mode based on the mode signal MD, and may correspond to each of the first and second memory packages 26_1 and 26_2 of FIG. 2B. For example, as shown in FIG. 6A, the first controller channel C_CH1 may be connected to the first and second memory channels M_CH1 and M_CH2, and the second controller channel C_CH2 may be connected to the third and fourth memory channels M_CH3 and M_CH4.

Referring to FIG. 6B, the memory package 60b may include an interface device 62b and first to fourth memory devices 64_1 to 64_4. The interface device 62b may be configured to be set to the second mode based on the mode signal MD, and may correspond to each of the first to eighth memory packages 24_1 to 24_8 of FIG. 2A. For example, as shown in FIG. 6B, the first controller channel C_CH1 may be connected to the first to fourth memory channels M_CH1 to M_CH4, while the second controller channel C_CH2 may be disconnected from the first to fourth memory channels M_CH1 to M_CH4 and may not, in the second mode, be in use.

Figure 7A:
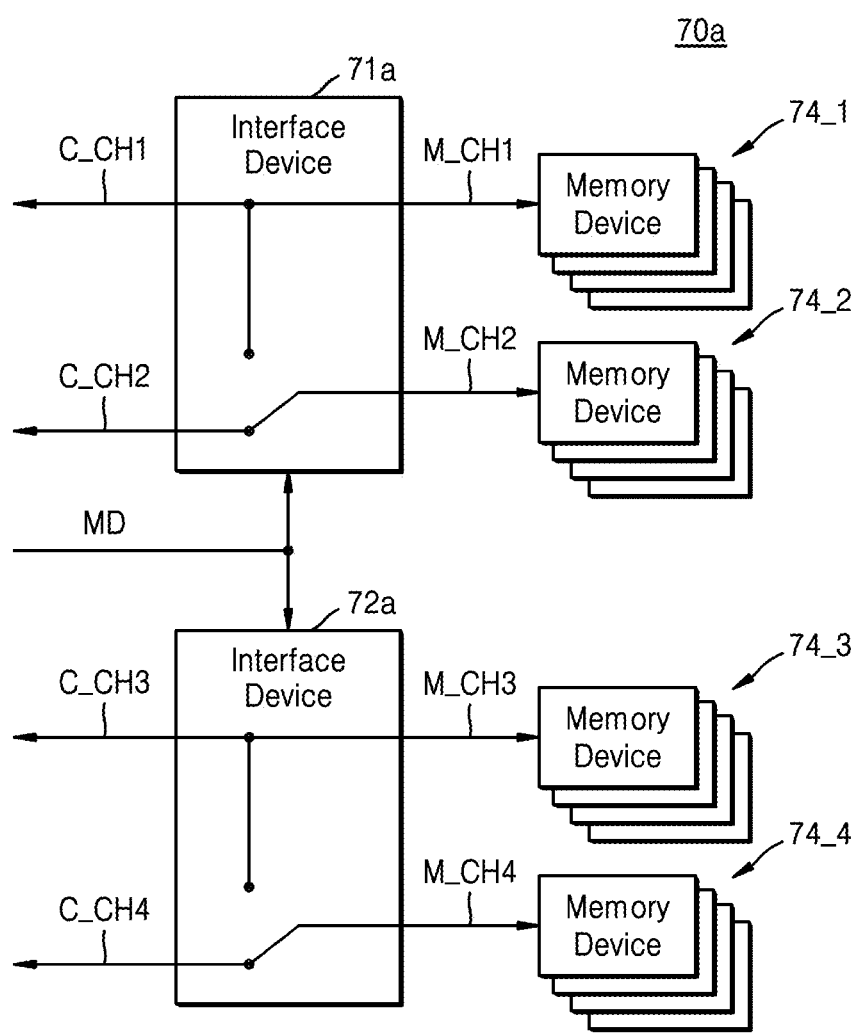
FIGS. 7A and 7B are block diagrams illustrating memory packages set to different modes according to example embodiments of the inventive concepts.
Figure 7B:
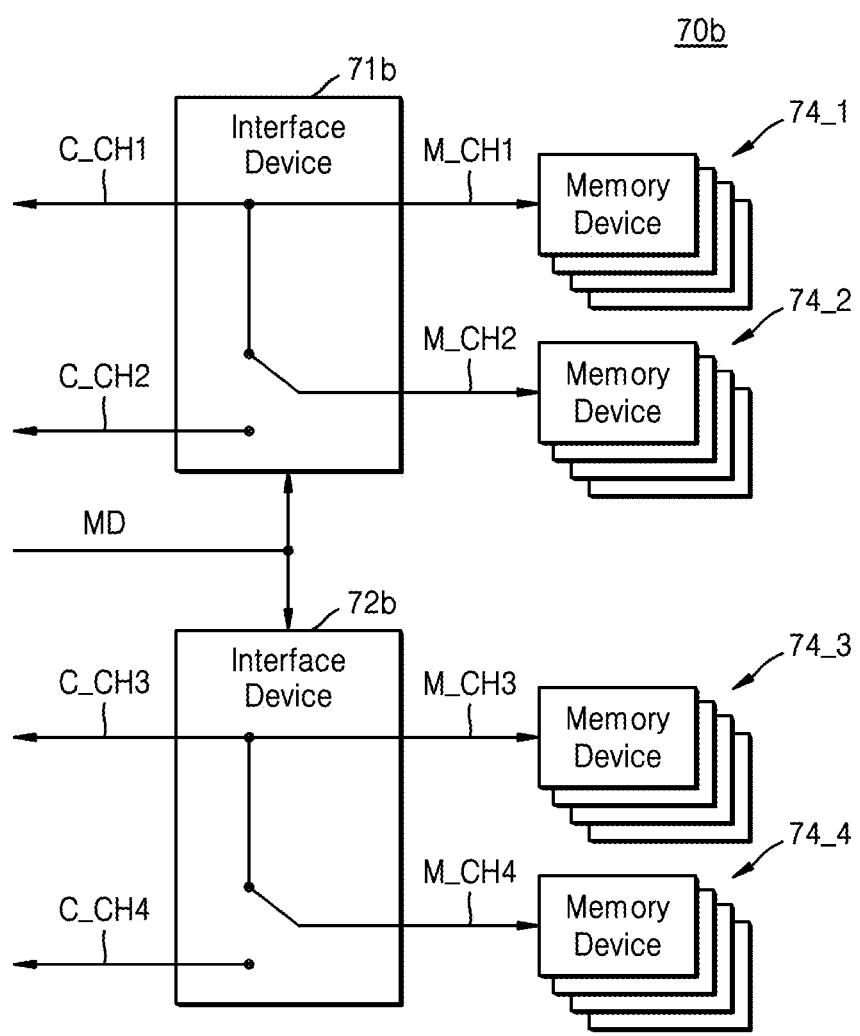

FIGS. 7A and 7B are block diagrams illustrating memory packages set to different modes according to some example embodiments of the inventive concepts. Specifically, the block diagram of FIG. 7A schematically shows a memory package 70a set to the first mode, and the block diagram of FIG. 7B schematically shows a memory package 70b set to the second mode. Compared with the memory packages 60a and 60b of FIGS. 6A and 6B, each of the memory packages 70a and 70b of FIGS. 7A and 7B may include two interface devices.

Referring to FIG. 7A, the memory package 70a may include first and second interface devices 71a and 72a, and first to fourth memory devices 74_1 to 74_4. The first and second interface devices 71a and 72a may be set to the first mode based on the mode signal MD. Accordingly, as shown in FIG. 7A, by the first interface device 71a, the first controller channel C_CH1 may be connected to the first memory channel M_CH1, and the second controller channel C_CH2 may be connected to the second memory channel M_CH2. In addition, as shown in FIG. 7A, by the second interface device 72a, the third controller channel C_CH3 may be connected to the third memory channel M_CH3, and the fourth controller channel C_CH4 may be connected to the fourth memory channel M_CH4.

Referring to FIG. 7B, the memory package 70b may include first and second interface devices 71b and 72b, and first to fourth memory devices 74_1 to 74_4. The first and second interface devices 71b and 72b may be set to the second mode based on the mode signal MD. Accordingly, as shown in FIG. 7B, by the first interface device 71b, the first controller channel C_CH1 may be connected to the first and second memory channels M_CH1 and M_CH2, while the second controller channel C_CH2 may be disconnected from the first and second memory channels M_CH1 and M_CH2 and may not be used. In addition, as shown in FIG. 7B, by the second interface device 72b, the third controller channel C_CH3 may be connected to the third and fourth memory channels M_CH3 and M_CH4, while the fourth controller channel C_CH4 may be disconnected from the third and fourth memory channels M_CH3 and M_CH4 and may not, in the second mode, be in use.

Figure 8A:
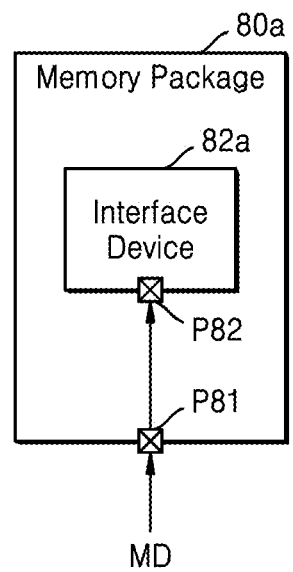
FIGS. 8A and 8B are block diagrams illustrating examples of a memory package according to some example embodiments of the inventive concepts.
Figure 8B:
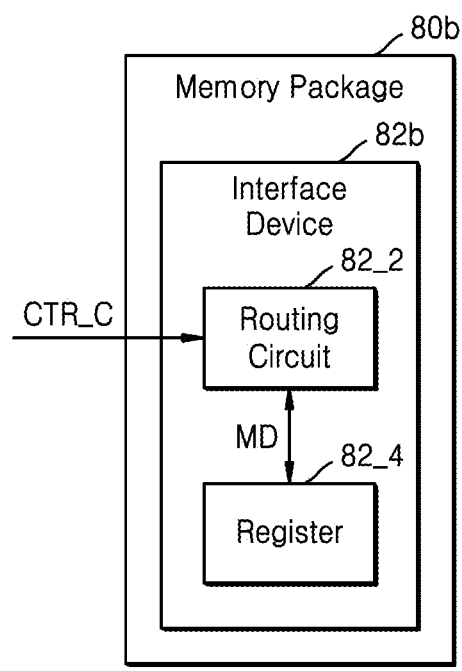

FIGS. 8A and 8B are block diagrams illustrating examples of a memory package according to some example embodiments of the inventive concepts. Specifically, the block diagrams of FIGS. 8A and 8B illustrate example embodiments of memory packages 80a and 80b that are configured to receive the mode signal MD in different ways.

Referring to FIG. 8A, the memory package 80a may include an interface device 82a and a first dedicated pin P81 for receiving the mode signal MD. The first dedicated pin P81 may be exposed to the outside of the memory package 80a, and the memory package 80a may receive the mode signal MD through a signal line connected to the first dedicated pin P81. In addition, the interface device 82a may include a second dedicated pin P82 for receiving the mode signal MD. The second dedicated pin P82 may be exposed to the outside of the interface device 82a, and the interface device 82a may receive the mode signal through a signal line interconnecting the first and second dedicated pins P81 and P82. In some example embodiments, the memory package 80a may be set to one of two modes, and the mode signal MD may be a 1-bit signal received through the first and second dedicated pins P81 and P82. In addition, in some example embodiments, the memory package 80a may be configured to be set to one of three or more modes. For example, the mode signal MD may be a multi-bit signal and the memory package 80a may be configured to receive the mode signal MD through a plurality of pins including the first dedicated pin P81 and may receive the mode signal MD through serial communication through the first dedicated pin P81.

Referring to FIG. 8B, the memory package 80b may include an interface device 82b, and the interface device 82b may include a routing circuit 82_2 and a register 82_4. In the memory package 80b of FIG. 8B, the mode signal MD may be received through a controller channel. For example, as shown in FIG. 8B, the routing circuit 82_2 may be configured to receive a control signal CTR_C through the controller channel, and to obtain the mode signal MD by processing (e.g., decoding) the control signal CTR_C. The routing circuit 82_2 may be configured to set one of a plurality of modes by setting the register 82_4 based on the obtained mode signal MD, and to interconnect a controller channel to a memory channel, or to disconnect the controller channel from the memory channel based on a value set in the register 82_4.

Figure 9A:
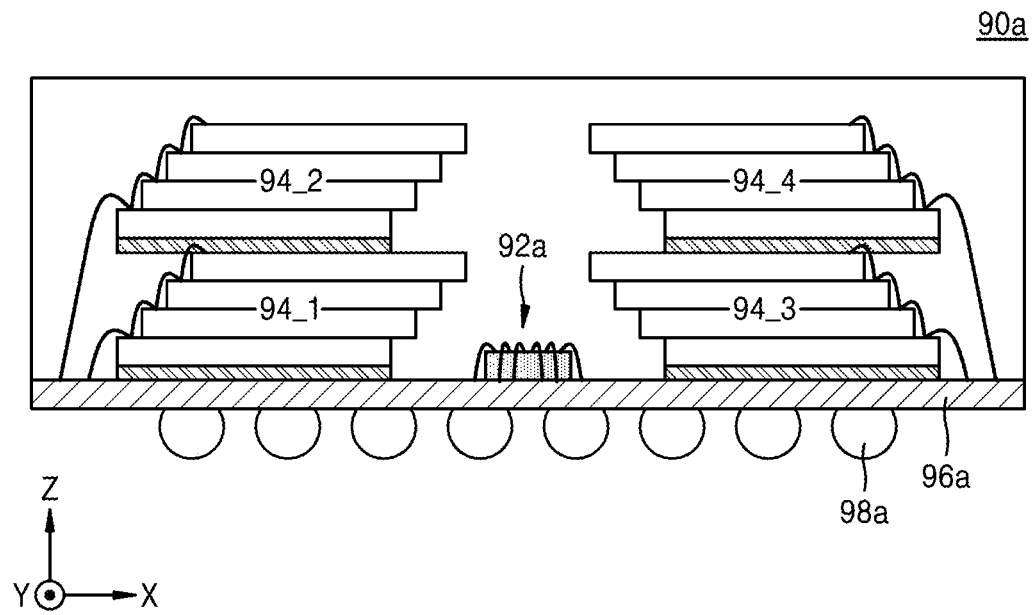
FIGS. 9A, 9B, and 9C are cross-sectional views illustrating examples of a memory package according to some example embodiments of the inventive concepts.
Figure 9B:
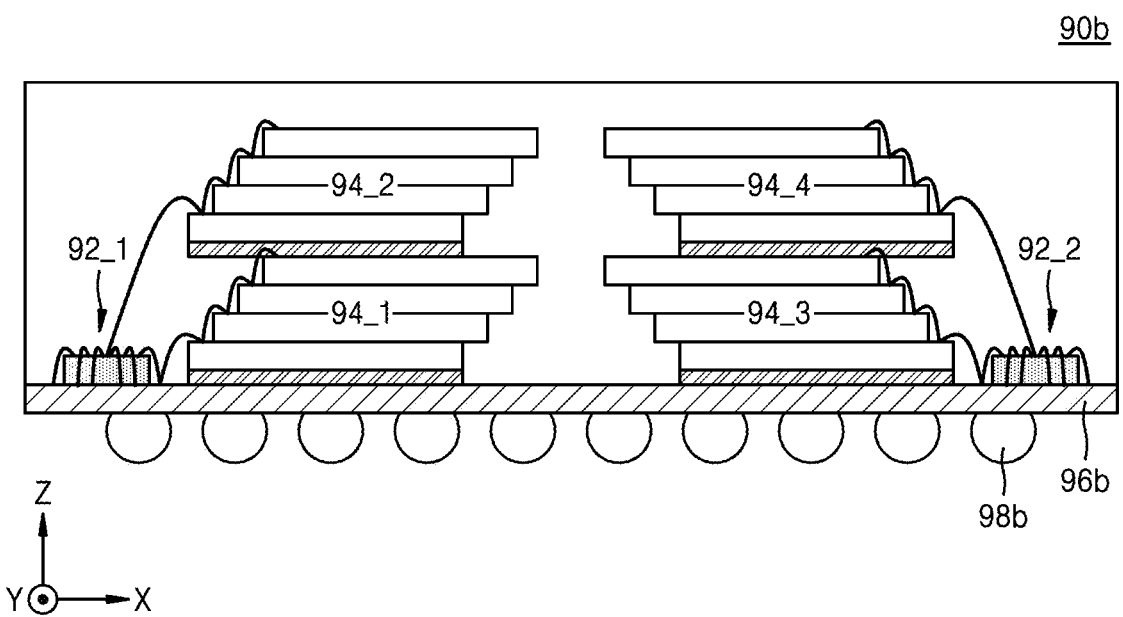
Figure 9C:
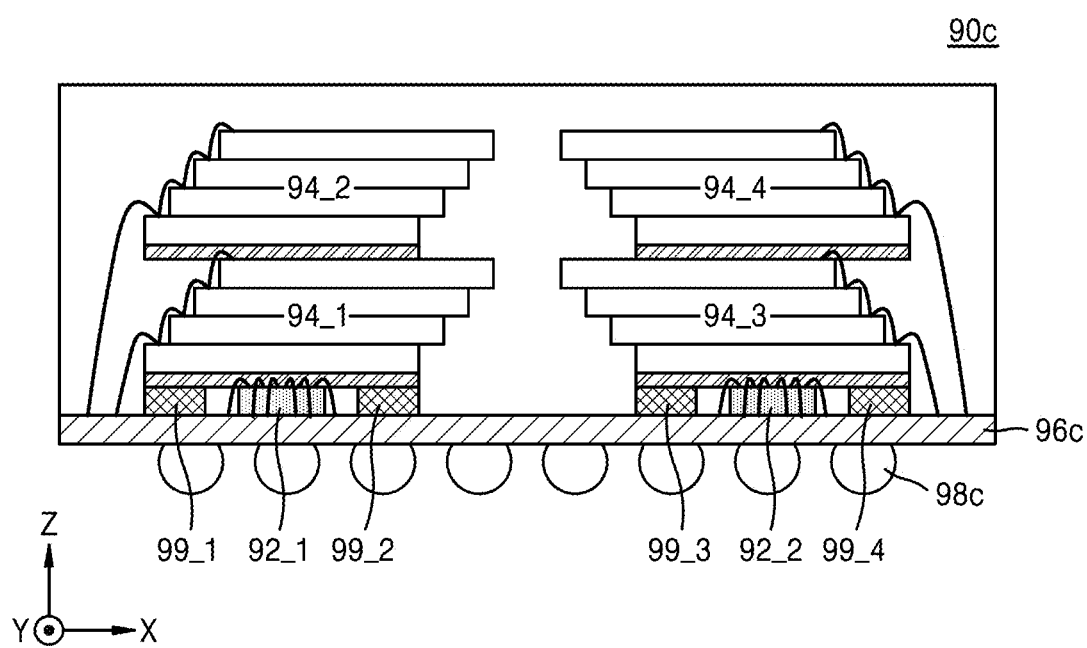

FIGS. 9A, 9B, and 9C are cross-sectional views illustrating examples of a memory package according to some example embodiments of the inventive concepts. As shown in FIGS. 9A, 9B, and 9C, each of memory packages 90a, 90b, and 90c may include and/or be included in a multi-chip package. Hereinafter, a plane consisting of the X-axis and the Y-axis may be referred to as a horizontal plane, and a component disposed in the +Z direction, relative to other components, may be referred to as the component being over the other components, and the component disposed in the −Z direction relative to the other components may be referred to as the component being below the other components. However, it will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. In addition, among surfaces of the component, a surface exposed in the +Z direction may be referred to as an upper surface, and a surface exposed in the −Z direction may be referred to as a lower surface. Hereinafter, duplicated descriptions of FIGS. 9A, 9B, and 9C will be omitted.

Referring to FIG. 9A, a memory package 90a may include balls 98a, a printed circuit board 96a, an interface device 92a, and first to fourth memory devices 94_1 to 94_4. In some embodiments, the memory package 90a may correspond to the memory packages 60a and 60b of FIGS. 6A and 6B. The balls 98a may correspond to pins (not illustrated) exposed to the outside of the memory package 90a and may be on the lower surface of the printed circuit board 96a. The balls 98a may be configured to electrically connect the memory package 90a to a redistribution structure (not shown) and/or a host and may, for example, include a solder ball and/or bump including a metal such as tin (Sn), lead (Pb), silver (Ag), copper (Cu), bismuth (Bi), indium (In), zinc (Zn), antimony (Sb) or a combination thereof. The memory package 90a may include a plurality of balls corresponding to the available controller channels, and thus the controller channel may be referred to as a ball-side channel. In addition, in some embodiments, as described above with reference to FIG. 8A, the memory package 90a may include at least one ball for receiving the mode signal MD. The printed circuit board 96a may include patterns corresponding to signal lines, and the interface device 92a and the first to fourth memory devices 94_1 to 94_4 may be mounted on the upper surface of the printed circuit board 96a.

Each of the first to fourth memory devices 94_1 to 94_4 may include stacked memory chips (and/or memory dies). For example, the first memory device 94_1 may include four memory chips stacked on the printed circuit board 96a, and the second memory device 94_2 may include four memory chips stacked on the first memory device 94_1. In addition, the third memory device 94_3 may include four memory chips stacked on the printed circuit board 96a, and the fourth memory device 94_4 may include four memory chips stacked on the third memory device 94_3. As shown in FIG. 9A, each of the stacked memory chips may be connected to patterns formed on the printed circuit board 96a through wires.

The interface device 92a may be on the printed circuit board 96a between the first and second memory devices 94_1 and 94_2, and the third and fourth memory devices 94_3 and 94_4, and may be referred to as an interface chip. Different from the interface devices described above with reference to the drawings, an interface device that supports one controller channel and two memory channels to commonly support the memory system 20a of FIG. 2A and the memory system 20b of FIG. 2B may be used for four memory devices included in the memory package. In this case, each of the first to eighth memory packages 24_1 to 24_8 of FIG. 2A may include three interface devices that are hierarchically connected, and each of the first and second memory packages 26_1 and 26_2 of FIG. 2B may include two interface devices. Accordingly, as shown in FIG. 9A, the memory package 90a including one interface device 92a may have a shorter length in an X-axis direction.

Referring to FIG. 9B, the memory package 90b may include balls 98b, a printed circuit board 96b, first and second interface devices 92_1 and 92_2, and first to fourth memory devices 94_1 to 94_4. In some embodiments, the memory package 90b may correspond to the memory packages 70a and 70b of FIGS. 7A and 7B. As shown in FIG. 9B, the first and second interface devices 92_1 and 92_2 may be on the printed circuit board 96b, and the first to fourth memory devices 94_1 to 94_4 may be on the printed circuit board 96b between the first and second interface devices 92_1 and 92_2.

Referring to FIG. 9C, the memory package 90c may include balls 98c, a printed circuit board 96c, first and second interface devices 92_1 and 92_2, and first to fourth memory devices 94_1 to 94_4. In some embodiments, the memory package 90c may correspond to the memory packages 70a and 70b of FIGS. 7A and 7B. As shown in FIG. 9C, first and second spacers 99_1 and 99_2 may be on the printed circuit board 96c, and the first interface device 92_1 may be between the first and second spacers 99_1 and 99_2. Similarly, third and fourth spacers 99_3 and 99_4 may be on the printed circuit board 96c, and the second interface device 92_2 may be between the third and fourth spacers 99_3 and 99_4.

The first memory device 94_1 may include four memory chips stacked on the first interface device 92_1 and the first and second spacers 99_1 and 99_2, and the second memory device 94_2 may include four memory chips stacked on the first memory device 94_1. In addition, the third memory device 94_3 may include four memory chips stacked on the second interface device 92_2 and the third and fourth spacers 99_3 and 99_4, and the fourth memory device 94_4 may include four memory chips stacked on the third memory device 94_3. A structure, as shown in FIG. 9C, including memory chips stacked on the spacers and the interface chip, may be referred to as a dolmen structure.

Figure 10:
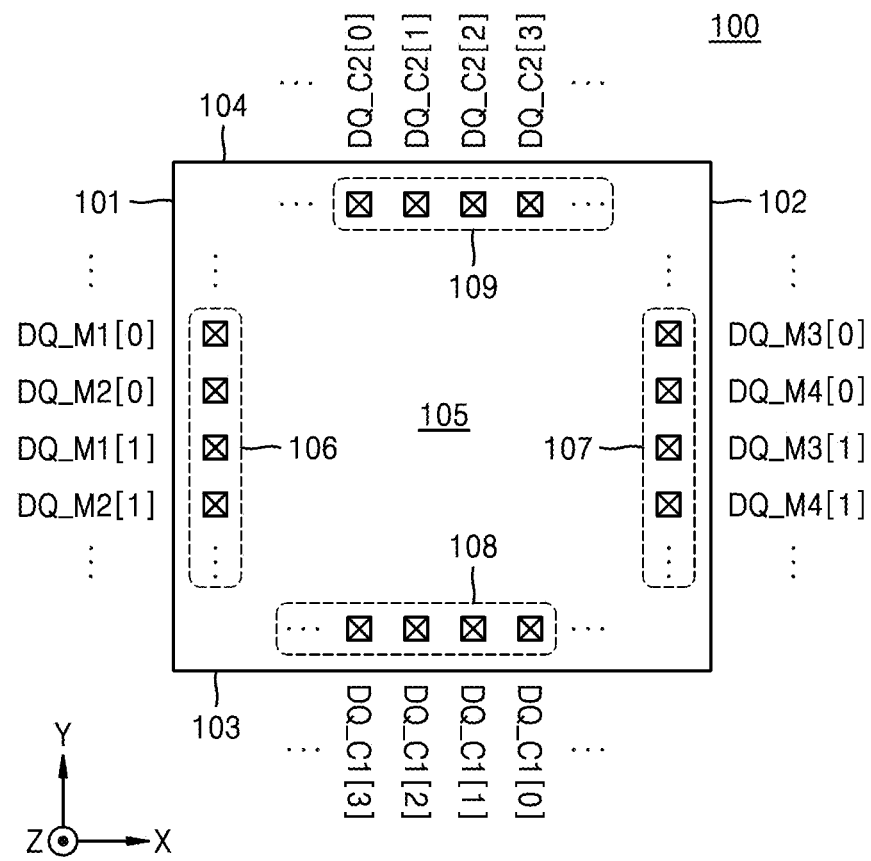
FIG. 10 is a diagram illustrating an upper surface of an interface device according to an example embodiment of the inventive concepts.

FIG. 10 is a diagram illustrating an upper surface 105 of an interface device 100 according to an example embodiment of the inventive concepts. In some embodiments, the interface device 100 of FIG. 10 may correspond to the interface device 92a of FIG. 9A, and a lower surface of the interface device 100 may contact an upper surface of the printed circuit board 96a of FIG. 9A. Hereinafter, FIG. 10 will be described with reference to FIG. 9A.

The interface device 100 may include a plurality of pins exposed on the upper surface 105 of the interface device 100. For example, as shown in FIG. 10, pins may be on the upper surface 105 of the interface device 100 adjacent to first to fourth edges 101, 102, 103 and 104 of the interface device 100. A wire may be connected to the pin, and the pin may also be referred to as a pad. The first and second memory devices 94_1 and 94_2 may be adjacent to the first edge 101, and the third and fourth memory devices 94_3 and 94_4 may be adjacent to the second edge 102.

As shown in FIG. 10, pins 106 corresponding to first and second memory channels, for communicating with the first and second memory devices 94_1 and 94_2, may be adjacent to the first edge 101 of the interface device 100, and pins 107 corresponding to third and fourth memory channels, for communicating with the third and fourth memory devices 94_3 and 94_4, may be adjacent to the second edge 102 of the interface device 100. In addition, pins 108 corresponding to the first controller channel, for communicating with the memory controller, may be adjacent to the third edge 103, and pins 109 corresponding to the second controller channel, for communicating with the memory controller, may be adjacent to the fourth edge 104.

Figure 11:
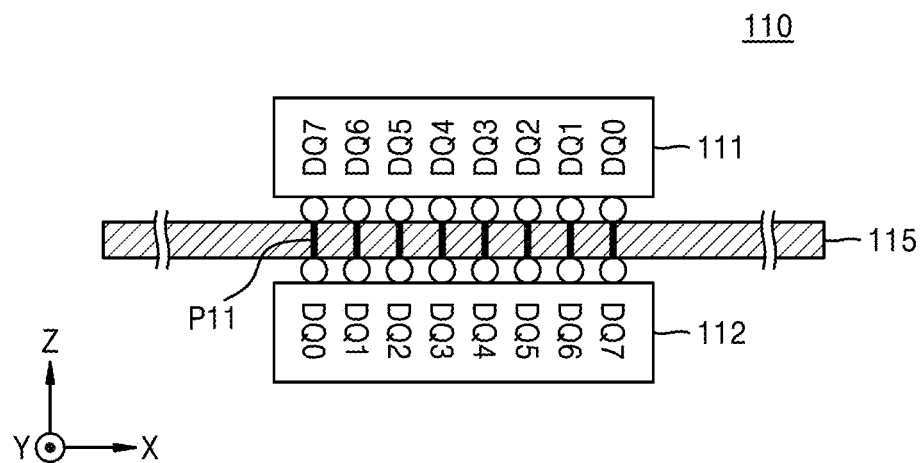
FIG. 11 is a cross-sectional view illustrating a memory system according to an example embodiment of the inventive concepts.

FIG. 11 is a cross-sectional view illustrating a memory system 110 according to an example embodiment of the inventive concepts. Specifically, FIG. 11 shows a cross-section of a portion of the memory system 110. As shown in FIG. 11, the memory system 110 may include a printed circuit board 115 and first and second memory packages 111 and 112. The memory system 110 may further include a memory controller and an additional memory package mounted on the printed circuit board 115.

Each of the first and second memory packages 111 and 112 may be configured to mirror signal lines (e.g., data lines) included in a controller channel, based on a mirroring signal (also referred to as a second signal herein) received from outside of the memory package. For example, the first memory package 111 may mirror signals that are transmitted through pins DQ0 to DQ7 corresponding to 8-bit data lines based on the mirroring signal. Accordingly, as shown in FIG. 11, when the first memory package 111 is mounted on the upper surface of the printed circuit board 115, and the second memory package 112 is mounted on the lower surface of the printed circuit board 115, the printed circuit board 115 may include a simple pattern P11 to interconnect 8-bit data lines. As a result, the routing complexity of the memory packages including the first and second memory packages 111 and 112 may be reduced due to the simple pattern P11, and the operation reliability and performance of the memory system 110 may be improved. Mirroring of signal lines may be provided by an interface device included in each of the first and second memory packages 111 and 112, and an example of the interface device that may provide mirroring of signal lines will be described later with reference to FIG. 12.

Figure 12:
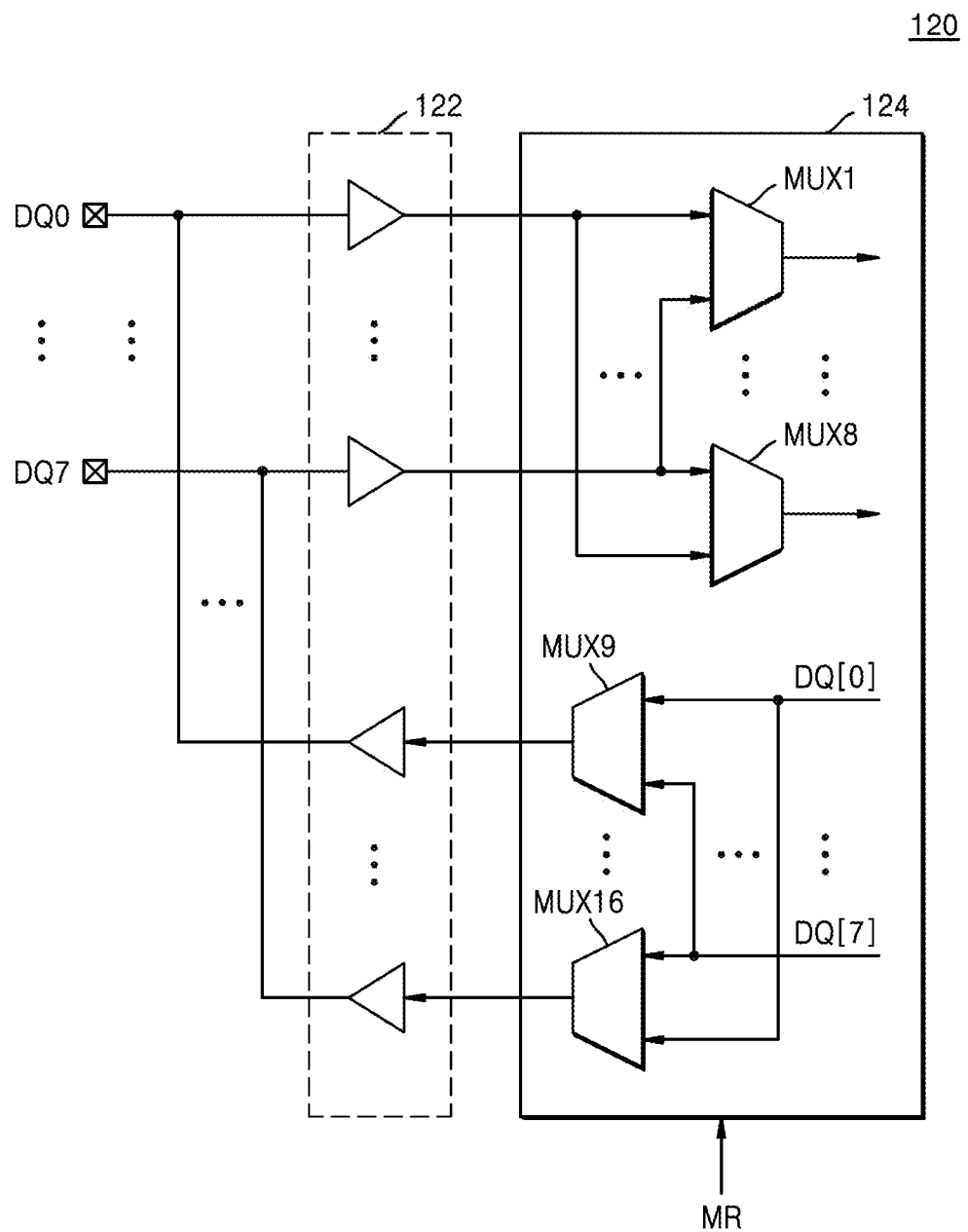
FIG. 12 is a block diagram illustrating an interface device according to an example embodiment of the inventive concepts.

FIG. 12 is a block diagram illustrating an interface device 120 according to an example embodiment of the inventive concepts. Specifically, the block diagram of FIG. 12 shows an interface device 120 that provides mirroring of data lines based on a mirroring signal MR. As shown in FIG. 12, the interface device 120 may include a controller interface circuit 122 and a routing circuit 124.

The interface circuit 122 may include buffers connected to first to eighth data pins DQ0 to DQ7 corresponding to data lines included in a first controller channel. The first to eighth data pins DQ0 to DQ7 of the interface circuit 122 may be respectively connected to eight data pins (e.g., DQ0 to DQ7 of FIG. 11) of a memory package including the interface device 120. The routing circuit 124 may be configured to receive output signals of buffers included in the controller interface circuit 122 and may provide input signals to the buffers included in the controller interface circuit 122. In addition, the routing circuit 124 may be configured to receive the mirroring signal MR from outside of the interface device 120, and may include first to eighth multiplexers MUX1 to MUX8 and ninth to sixteenth multiplexers MUX9 to MUX16 that are controlled based on the mirroring signal MR.

The first to eighth multiplexers MUX1 to MUX8 may be configured to mirror signals received through the first to eighth data pins DQ0 to DQ7 based on the mirroring signal MR. For example, as shown in FIG. 12, the first multiplexer MUX1 may be configured to output a signal received through the first data pin DQ0 in response to an inactivated mirroring signal MR, and/or to output a signal through the eighth data pin DQ7 in response to an activated mirroring signal MR. Similarly, the ninth to sixteenth multiplexers MUX9 to MUX16 may be configured to mirror signals to be transmitted through the first to eighth data pins DQ0 to DQ7 based on the mirroring signal MR. For example, as shown in FIG. 12, the ninth multiplexer MUX9 may output a signal DQ[0] corresponding to a least significant bit (LSB) in response to the inactivated mirroring signal MR through the controller interface circuit 122, while the ninth multiplexer MUX9 may output a signal DQ[7] corresponding to a most significant bit (MSB) in response to the activated mirroring signal MR through the controller interface circuit 122 to the eighth data pin DQ7.

The interface device 120 may be configured to obtain the mirroring signal MR from outside of the interface device 120 and/or from outside of a memory package including the interface device 120, in various ways. For example, the mirroring signal MR may be received through at least one dedicated pin as described above with reference to FIG. 8A, and/or may be received through the controller channel as described above with reference to FIG. 8B.

Figure 13A:
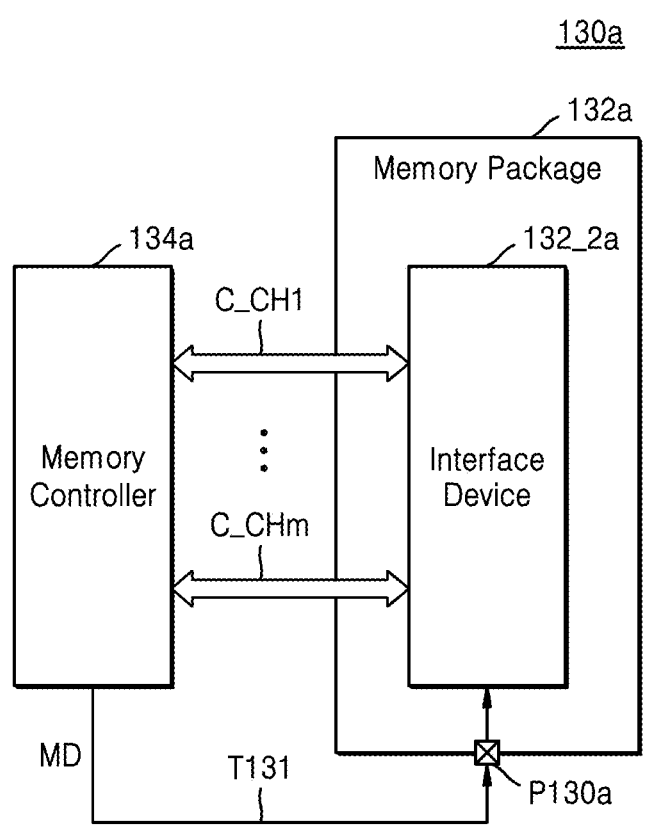
FIGS. 13A and 13B are block diagrams illustrating examples of a memory system according to example embodiments of the inventive concepts.
Figure 13B:
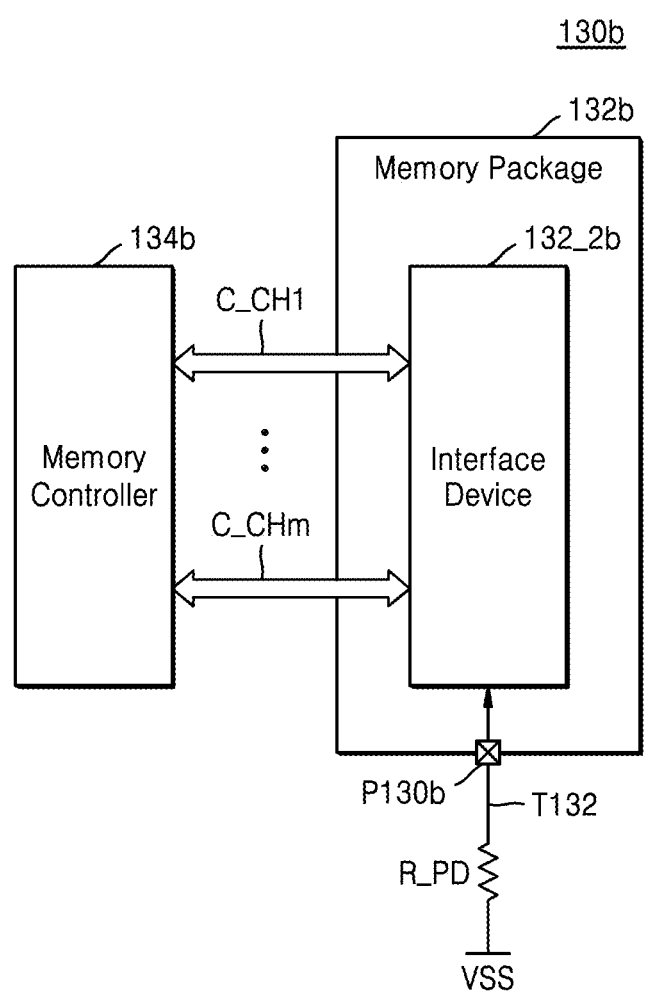

FIGS. 13A and 13B are block diagrams illustrating examples of a memory system according to some example embodiments of the inventive concepts. Specifically, as described above with reference to FIG. 8A, the block diagrams of FIGS. 13A and 13B show memory systems 130a and 130b in which modes of memory packages 132a and 132b receiving a mode signal MD through at least one dedicated pin, are set in different ways. Hereinafter, duplicated descriptions of FIGS. 13A and 13B will be omitted.

Referring to FIG. 13A, the memory system 130a may include a memory controller 134a and the memory package 132a configured to communicate with each other through first to mth controller channels C_CH1 to C_CHm. The memory package 132a may include an interface device 132_2a and a dedicated pin P130a, and may be configured to receive the mode signal MD through the dedicated pin P130a. The dedicated pin P130a and the memory controller 134a may be connected through a pattern T131, and the memory controller 134a may be configured to provide the mode signal MD to the memory package 132a through the pattern T131. For example, the memory controller 134a may set a mode of the memory package 132a (and/or the interface device 132_2a) through the mode signal MD based on the configuration of the memory system 130a. The memory controller 134a may be programmed to generate a fixed mode signal MD during the manufacturing process of the memory system 130a, and may change the mode signal MD in order to change the number (e.g., m) of first to mth controller channels C_CH1 to C_CHm, as necessary. In some embodiments, the pattern T131 may be included in the printed circuit board (e.g., 115 of FIG. 11) on which the memory controller 134a and the memory package 132a are mounted.

Referring to FIG. 13B, the memory system 130b may include a memory controller 134b and the memory package 132b configured to communicate with each other through first to mth controller channels C_CH1 to C_CHm, and may further include a pull-down resistor R_PD. The memory package 132b may include an interface device 132_2b and a dedicated pin P130b, and may be configured to receive the mode signal MD through the dedicated pin P130b. The dedicated pin P130b may be connected to the pull-down resistor R_PD applied with a ground potential VSS through a pattern T132. Accordingly, the ground potential VSS may be applied to the dedicated pin P130b, and the memory package 132b (and/or the interface device 132_2b) may be configured to be set to a mode corresponding to the ground potential VSS (for example, a first mode). In some embodiments, the pull-down resistor R_PD may be mounted on the printed circuit board together with the memory controller 134b and the memory package 132b, and the pattern T132 may be included in the printed circuit board. In some embodiments, the ground potential VSS may be directly applied to the dedicated pin P130b. In addition, a pull-up resistor, to which a positive supply voltage is applied, may be connected to the dedicated pin P130b and/or the positive supply voltage may be directly applied to the dedicated pin P130b, and accordingly, the memory package 132b (or the interface device 132_2b) may be set to a mode corresponding to the positive supply voltage (e.g., a second mode).

Figure 14:
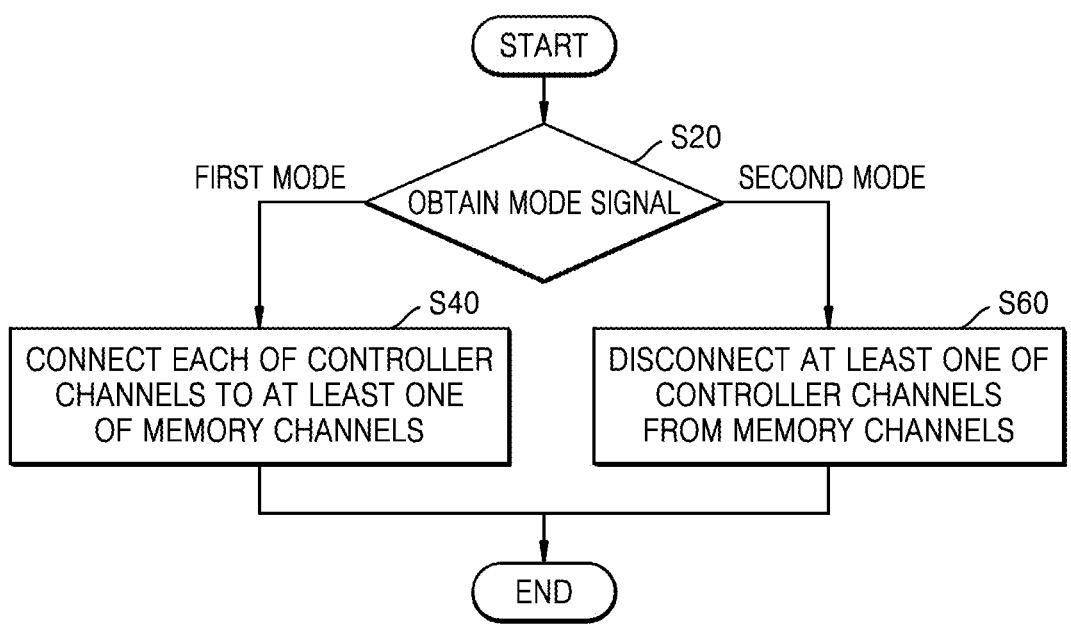
FIG. 14 is a flowchart illustrating a method for affecting an interface between a memory device and a memory controller according to an example embodiment of the inventive concepts.

FIG. 14 is a flowchart illustrating a method for affecting an interface between a memory device and a memory controller according to an example embodiment of the inventive concepts. As shown in FIG. 14, the method for an interface between the memory device and the memory controller may include operations S20, S40, and S60. In some embodiments, the method of FIG. 14 may be performed by the interface device 12_0 of FIG. 1, and FIG. 14 will be described below with reference to FIG. 1.

In operation S20, an operation of obtaining the mode signal MD may be performed. For example, the interface device 12_0 of FIG. 1 may receive the mode signal MD through a dedicated pin and/or obtain the mode signal MD by decoding a signal received through the controller channel. As shown in FIG. 14, when the mode signal MD corresponds to a first mode, operation S40 may be subsequently performed, while when the mode signal MD corresponds to a second mode, operation S60 may be subsequently performed.

In operation S40, an operation of connecting each of the controller channels to at least one of the memory channels may be performed. For example, in the first mode, the interface device 12_0 may provide m or more available controller channels including first to mth controller channels C_CH1 to C_CHm, and may connect each of the available controller channels to at least one of first to nth memory channels M_CH1 to M_CHn.

In operation S60, an operation of disconnecting at least one of the controller channels from the memory channels may be performed. For example, in the second mode, the interface device 12_0 may disconnect at least one controller channel among m or more available controller channels including the first to mth controller channels C_CH1 to C_CHm from the first to nth memory channels M_CH1 to M_CHn and thus the disconnected at least one controller channel may not be used.

While the inventive concepts have been particularly shown and described with reference to embodiments thereof, it will be understood that various changes in form and details may be made therein without departing from the spirit and scope of the following claims.

What is claimed is:

1. An interface device between a plurality of memory devices and a memory controller, the interface device comprising:
 processing circuitry configured to
  provide a plurality of controller channels for communicating with the memory controller;
  provide a plurality of memory channels for communicating with the plurality of memory devices;
  connect each of the plurality of controller channels to at least one of the plurality of memory channels in a first mode; and
  disconnect at least one of the plurality of controller channels from the plurality of memory channels in a second mode,
 wherein in the second mode a connected controller channel of the plurality of controller channels is configured to output at least one of a retiming signal or a clock signal.

2. The interface device of claim 1, wherein the processing circuitry is configured to be set to the first mode or the second mode based on a first signal received from outside of the interface device.

3. The interface device of claim 2, further comprising at least one dedicated pin exposed to the outside of the interface device and configured to receive the first signal.

4. The interface device of claim 2,
 wherein the processing circuitry comprises a register configured to be set based on the first signal,
 wherein the first signal is received through at least one of the plurality of controller channels.

5. The interface device of claim 1, wherein
 the plurality of controller channels includes a first controller channel and a second controller channel,
 the plurality of memory channels include a first memory channel, a second memory channel, a third memory channel, and a fourth memory channel, and
 the processing circuitry is configured to connect the first controller channel to the first and second memory channels and to connect the second controller channel to the third and fourth memory channels, in the first mode, and to connect the first controller channel to the first, second, third, and fourth memory channels and disconnect the second controller channel from the first, second, third, and fourth memory channels, in the second mode.

6. The interface device of claim 1, wherein
 the plurality of controller channels include a first controller channel and a second controller channel,
 the plurality of memory channels include a first memory channel and a second memory channel, and
 the processing circuitry is configured to respectively connect the first and second controller channels to the first and second memory channels, in the first mode, and to connect the first controller channel to the first and second memory channels and disconnect the second controller channel from the first and second memory channels, in the second mode.

7. The interface device of claim 1, wherein the processing circuitry is configured to mirror data lines included in each of the plurality of controller channels based on a second signal received from outside of the interface device.

8. The interface device of claim 1, wherein the processing circuitry includes
 a first plurality of buffers respectively corresponding to the plurality of controller channels, and a second plurality of buffers respectively corresponding to the plurality of memory channels.

9. The interface device of claim 1, wherein the plurality of controller channels and the plurality of memory channels are based on the same protocol.

10. A memory package comprising:
 a plurality of memory devices; and
 at least one interface device between the plurality of memory devices and a memory controller, the at least one interface device being configured to provide a plurality of controller channels for communicating with the memory controller and a plurality of memory channels for communicating with the plurality of memory devices,
 wherein the at least one interface device is configured to, in a first mode, connect each of the plurality of controller channels to at least one of the plurality of memory channels, and in a second mode, disconnect at least one of the plurality of controller channels from the plurality of memory channels, and
 the at least one interface device is configured to mirror data lines included in each of the plurality of controller channels based on a second signal received from outside of the memory package.

11. The memory package of claim 10, wherein the at least one interface device is configured to be set to the first mode or the second mode based on a first signal received from outside of the memory package.

12. The memory package of claim 10, wherein
 the at least one interface device is configured to provide first and second controller channels, and first, second, third, and fourth memory channels, and
 in the first mode, to connect the first controller channel to the first and second memory channels and connect the second controller channel to the third and fourth memory channels, and
 in the second mode, to connect the first controller channel to the first, second, third, and fourth memory channels and disconnect the second controller channel from the first, second, third, and fourth memory channels.

13. The memory package of claim 10, further comprising a printed circuit board; and
 spacers mounted on an upper surface of the printed circuit board,
 wherein the at least one interface device is mounted on the upper surface of the printed circuit board between the spacers, and
 the plurality of memory devices are stacked on the spacers and the at least one interface device.

14. A memory system comprising:
 a memory controller configured to provide a host channel for communicating with a host; and
 a first memory package comprising a plurality of memory devices and an interface device, the interface device configured to set a number of controller channels based on a first signal received from outside of the first memory package, the controller channels being for communicating with the memory controller,
 wherein the memory controller and the plurality of memory devices are configured to communicate with each other through at least one controller channel enabled by the interface device,
 wherein, the memory controller is configured to provide the first signal to the first memory package through the enabled at least one controller channel, and
 the interface device comprises a register to be set based on the first signal.

15. The memory system of claim 14, further comprising:
a printed circuit board on which the memory controller and the first memory package are mounted,
wherein the first memory package further comprises at least one dedicated pin contacting a pad of the printed circuit board, the at least one dedicated pin configured to receive the first signal.

16. The memory system of claim 15, wherein the printed circuit board comprises a pattern configured to pull-up and pull-down the at least one dedicated pin.

17. The memory system of claim 15, wherein
the printed circuit board comprises at least one pattern for connecting the memory controller to the at least one dedicated pin, and
the memory controller is configured to provide the first signal through the at least one pattern.

18. The memory system of claim 14, wherein the first memory package comprises at least one pin corresponding to a disabled controller channel and disconnected from the memory controller.

19. The memory system of claim 14, further comprising:
a printed circuit board, the first memory package mounted on an upper surface of the printed circuit board; and
a second memory package commonly connected to a first controller channel with the first memory package, the second memory package mounted on a lower surface of the printed circuit board,
wherein the interface device of the first memory package is configured to mirror data lines included in each of the set controller channels based on a second signal received from the outside.

\* \* \* \* \*